(12) United States Patent
Baur et al.

(10) Patent No.: US 12,407,527 B2
(45) Date of Patent: Sep. 2, 2025

(54) HOST, METHOD AND SYSTEM FOR THE SECURELY EXECUTING CONTROL APPLICATIONS

(71) Applicant: Siemens Aktiengesellschaft, Munich (DE)

(72) Inventors: Nils Baur, Erlangen (DE); Stephan Höme, Schwabach (DE); Harald Albrecht, Nuremberg (DE)

(73) Assignee: Siemens Aktiengesellschaft, Munich (DE)

( * ) Notice: Subject to any disclaimer, the term of this patent is extended or adjusted under 35 U.S.C. 154(b) by 201 days.

(21) Appl. No.: 18/127,756

(22) Filed: Mar. 29, 2023

(65) Prior Publication Data
US 2023/0318854 A1 Oct. 5, 2023

(30) Foreign Application Priority Data
Mar. 31, 2022 (EP) .................... 22165876

(51) Int. Cl.
- *H04L 9/40* (2022.01)
- *G06F 21/44* (2013.01)
- *H04L 9/32* (2006.01)

(52) U.S. Cl.
CPC .......... *H04L 9/3268* (2013.01); *G06F 21/44* (2013.01); *H04L 9/3247* (2013.01)

(58) Field of Classification Search
CPC ...... H04L 9/3268; H04L 9/3247; G06F 21/44
See application file for complete search history.

(56) References Cited

U.S. PATENT DOCUMENTS

| | | | |
|---|---|---|---|
| 7,174,541 B2 * | 2/2007 | Muller | G06F 11/36 717/124 |
| 10,565,092 B2 * | 2/2020 | Benes | G06F 11/0712 |

(Continued)

FOREIGN PATENT DOCUMENTS

| | | |
|---|---|---|
| CN | 110300096 | 10/2019 |
| CN | 110532766 | 12/2019 |

(Continued)

OTHER PUBLICATIONS

Kohnhauser Florian et al. "On the Security of IIoT Deployments: An Investigation of Secure Provisioning Solutions for OPC UA", IEEE Access, IEEE, USA, Bd. 9, 9. pp. 99299-99311, Jul. 2021.

*Primary Examiner* — Ghodrat Jamshidi
(74) *Attorney, Agent, or Firm* — Cozen O'Connor

(57) ABSTRACT

A method for securely executing control applications via software-implemented containers which are each loadable into a container runtime environment set up on a host and are executable there, wherein a check component of the respective host calculates a respective check identifier via host-specific features and via features of the respective control application, where the check identifier and an initial application certificate of the control application are communicated to a registration component, the registration component verifies the check identifier and the initial application certificate and, in cases of a positive verification result, creates a device configuration certificate and an application instance certificate and communicates them to the host, linking of the application instance certificate with the control application is authorized via the device configuration certificate, and where execution of the container providing the control application on the host is authorized by the application instance certificate.

15 Claims, 2 Drawing Sheets

(56) References Cited

U.S. PATENT DOCUMENTS

| | | | |
|---|---|---|---|
| 10,963,349 B2* | 3/2021 | Dhamdhere | G06F 11/1438 |
| 11,250,134 B2* | 2/2022 | Kumar | G06F 21/44 |
| 11,354,402 B2* | 6/2022 | Sugandhi | G06F 9/45558 |
| 11,429,719 B2 | 8/2022 | Ji | |
| 2004/0003325 A1* | 1/2004 | Muller | G06F 11/36 |
| | | | 717/124 |
| 2008/0147675 A1* | 6/2008 | Engehausen | H04L 67/34 |
| 2018/0365411 A1* | 12/2018 | Falk | H04L 63/123 |
| 2019/0065323 A1* | 2/2019 | Dhamdhere | G06F 11/1484 |
| 2019/0108116 A1* | 4/2019 | Benes | G06F 11/3696 |
| 2020/0151312 A1 | 5/2020 | Filipiak et al. | |
| 2021/0133312 A1* | 5/2021 | Sugandhi | G06F 21/57 |
| 2022/0286480 A1* | 9/2022 | Jadhav | H04L 63/20 |
| 2023/0179827 A1* | 6/2023 | Coburn, IV | H04N 21/4825 |
| | | | 725/78 |

FOREIGN PATENT DOCUMENTS

| | | |
|---|---|---|
| CN | 110602066 | 12/2019 |
| EP | 3709107 | 9/2020 |
| EP | 3975502 | 3/2022 |
| EP | 4152689 | 3/2023 |
| WO | 2020182627 | 9/2020 |

* cited by examiner

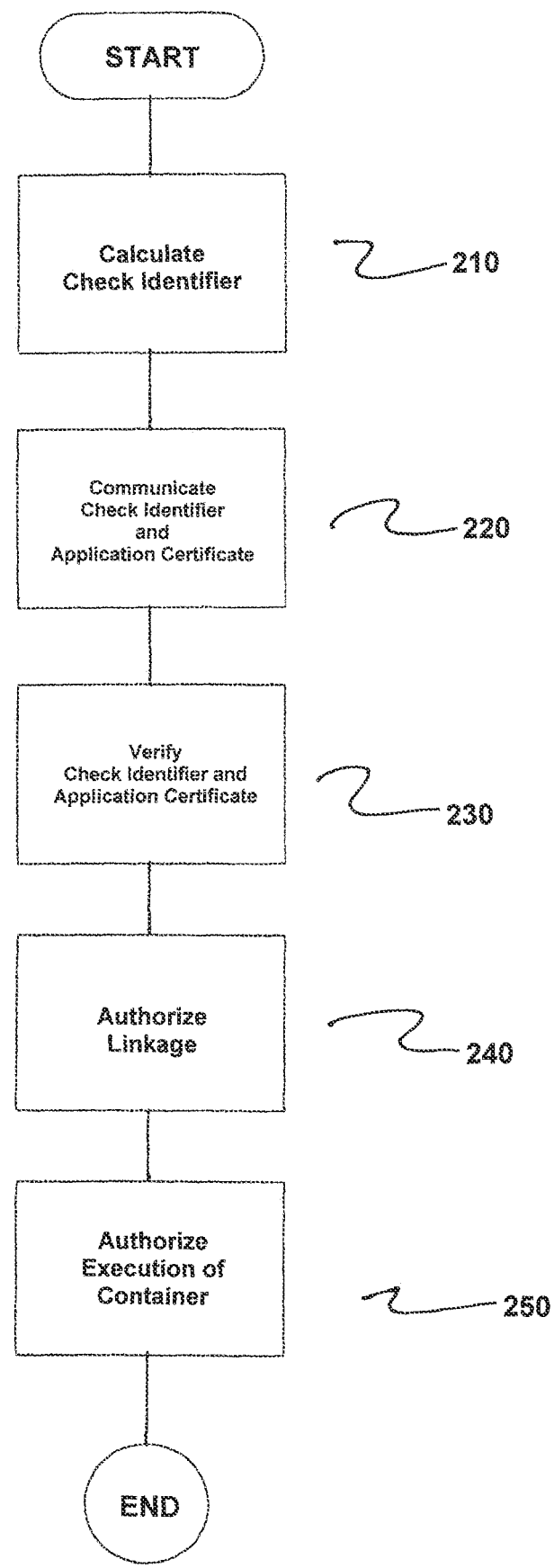

HOST, METHOD AND SYSTEM FOR THE SECURELY EXECUTING CONTROL APPLICATIONS

BACKGROUND OF THE INVENTION

1. Field of the Invention

The present invention relates to a method and a system for the secure execution of control applications, and to a host, in particular a host providing automation functions, within an industrial automation system, where the system and host are provided to implement the method in accordance with the invention.

2. Description of the Related Art

Industrial automation systems usually comprise a multiplicity of automation devices networked to one another via an industrial communication network and, within the scope of production or process automation, are used to control or regulate installations, machines or devices. Time-critical constraints in industrial automation systems mean that predominantly real-time communication protocols, such as PROFINET, PROFIBUS, real-time ethernet or time-sensitive networking (TSN), are used for communication between automation devices. In particular, control services and applications can be distributed, in an automated manner and depending on capacity utilization, among currently available hosts or virtual machines of an industrial automation system.

WO 2020/182627 A1 describes a method for monitoring the integrity of an industrial cyber-physical system in which measurement data acquired by various sensors of the cyber-physical system and/or control data intended for various actuators of the cyber-physical system are provided and/or tapped off. In addition, at least one measurement data correlation parameter between the measurement data acquired by the various sensors is determined, and/or at least one control data correlation parameter between the control data intended for the various actuators is determined. The at least one measurement data correlation parameter is compared with a measurement data correlation reference, and/or the at least one control data correlation parameter is compared with a control data correlation reference. The integrity of the cyber-physical system to be monitored is evaluated on the basis of comparison.

European patent application 21197157.7 relates to a method for creating a certificate for the secure provision of services via sequence control components in a sequence control environment to a service consumer. Here, each service is assigned at least one server component that is formed by a sequence control component that is loadable into the sequence control environment and is executable there. At least one proxy component of a subnetwork comprising the sequence control environment accepts queries from a service consumer. A central directory service component manages the addressing information (valid within the subnetwork) of an internal endpoint address of the server component and associated external endpoint address and communicates same to the proxy component. The server component is registered with its internal endpoint address. An internal directory service that obtains the required information about the external and associated internal endpoint addresses from the local directory service generates the certificate required for later encryption of communication, with the associated external endpoint address that has been determined, and communicates the certificate to the server component in order that a service consumer can establish an encrypted connection to the server component using the certificate.

European patent application 22152226.1 discloses a method for securely providing a service by a central provision instance on a device for execution upon retrieval by a service consumer. Here, each service is assigned at least one server component that is formed by a sequence control component that is loadable into the sequence control environment and is executable there. A uniquely identifiable executable instance of the service is provided to the device. During provision, the service is supplied together with a unique service certificate that is allocated to the service instance and that is inseparably linked with the service instance and uniquely identifies the service instance. In addition, a likewise unique device certificate associated with the service certificate is generated and communicated to the device. The device proves its identity at the service with the device certificate, while the service checks the device certificate with the aid of the service certificate. The device thus obtains the authority to transmit protected information, required for the further implementation of the provision of the service, in an application instance certificate to the service.

Particularly in the case of Open Platform Communications Unified Architecture (OPC UA) server apps, there are user-side requirements that go beyond purely providing connections between clients and servers and are geared toward checking whether control applications are trustworthy. Such checking is intended to be able to be realized with little complexity and without additional expert knowledge during set-up and operation. In view of future expected quantities of control applications to be provided and to be configured, a manageable complexity is of central importance here. Moreover, according to previous approaches, a relatively high degree of manual configuration is still required. This is time-intensive and susceptible to errors.

SUMMARY OF THE INVENTION

In view of the foregoing, it is an object of the present invention to provide a method for the secure execution of control applications which makes possible a simple and failsafe configuration of the control applications, and specifying a suitable apparatus for carrying out the method.

This and other objects and advantages are achieved in accordance with the invention by a method, a system, and by a host wherein, in accordance with the method of the invention, control applications are provided via software-implemented containers that are each loadable into a container runtime environment set up on a host and are executable there, where a check component of a respective host calculates a respective check identifier via host-specific features and via features of the respective control application. The check identifier and an initial application certificate of the control application are communicated to a registration component. In particular, the initial application certificate can be an Initial Device Identifier, IDevID, generated in accordance with Institute of Electrical and Electronics Engineers (IEEE) standard 802.1 AR.

The check identifier can be signed with little complexity, such as via a signature key assigned to an initial device certificate of the host. Advantageously, the initial application certificate is provided in each case by a provider of the respective control application or by an app store. For satisfying stringent security requirements, the check identifier and the initial application certificate preferably each comprise a common identifier, via which the check identifier and the initial application certificate are linked with one another.

In accordance with the invention, the registration component verifies the check identifier and the initial application certificate. In the case of a positive verification result, the registration component creates a device configuration certificate and an application instance certificate and communicates them to the host. Linking or linkage of the application instance certificate with the control application is authorized via the device configuration certificate. An execution of the container providing the control application on the host is authorized by the application instance certificate. Linking or linkage of the application instance certificate with the control application can result in particular in authentication functions of the control application being supplied and/or configured with the application instance certificate.

The present invention makes it possible to create device configuration certificates independently of a provider of the respective control application or via an app store. Corresponding ticket generators on the part of providers or app stores are therefore not required. In particular, provision and configuration processes are greatly simplified because device configuration and application instance certificates no longer need be kept available by control application providers or app store operators for a multiplicity of possible app and device variants.

In accordance with one preferred embodiment of the present invention, the host is authenticated vis-n-vis the registration component via the check identifier. The registration component can thus reliably compare indications that the initial application certificate comprises for correspondence with features used to calculate the check identifier. In particular, the registration component validates the check identifier and the initial application certificate if there is correspondence between the indications that the initial application certificate comprises and the compared features. As a result, an efficient and secure validation of the check identifier and of the initial application certificate becomes possible.

The initial application certificate and/or the application instance certificate comprise(s), for example, license information defining a functional scope of the control application. Therefore, a flexible and tamperproof activation of licensed functions of the control applications is thus possible. Furthermore, the check identifier, the device configuration certificate and/or the application instance certificate are/is preferably stored in a certificate memory of the host. As a result, a particularly secure implementation of the disclosed embodiments of the present invention is achieved.

The system in accordance with the invention is provided for performing the method in accordance with the disclosed embodiments and comprises at least one host and a registration component. The host is configured to provide control applications via software-implemented containers that are each loadable into a container runtime environment set up on the host and are executable there. Moreover, the host comprises a check component configured to calculate a respective check identifier via host-specific features and via features of the respective control application. The host is additionally designed to communicate the check identifier and an initial application certificate of the control application to the registration component.

The registration component of the system in accordance with the invention is configured to verify the check identifier and the initial application certificate and, in the case of a positive verification result, to create a device configuration certificate and an application instance certificate and to communicate them to the host. Furthermore, the host is additionally configured to authorize linkage of the application instance certificate with the control application via the device configuration certificate and to authorize an execution of the container providing the control application by the application instance certificate.

The host in accordance with the invention is suitable for the system in accordance with the invention and is configured to provide control applications via software-implemented containers that are each loadable into a container runtime environment set up on the host and are executable there. The host comprises a check component configured to calculate a respective check identifier via host-specific features and via features of the respective control application.

The host in accordance with the invention is additionally configured to communicate the check identifier and an initial application certificate of the control application to a registration component. Furthermore, the host is configured to authorize linkage of an application instance certificate generated by the registration component with the control application via a device configuration certificate generated by the registration component and to authorize an execution of the container providing the control application by the application instance certificate.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The present invention is explained in greater detail below on the basis of an exemplary embodiment with reference to the drawing, in which:

FIG. 2 is a flowchart of the method in accordance with the invention.

DETAILED DESCRIPTION OF THE EXEMPLARY EMBODIMENTS

Figure 1:
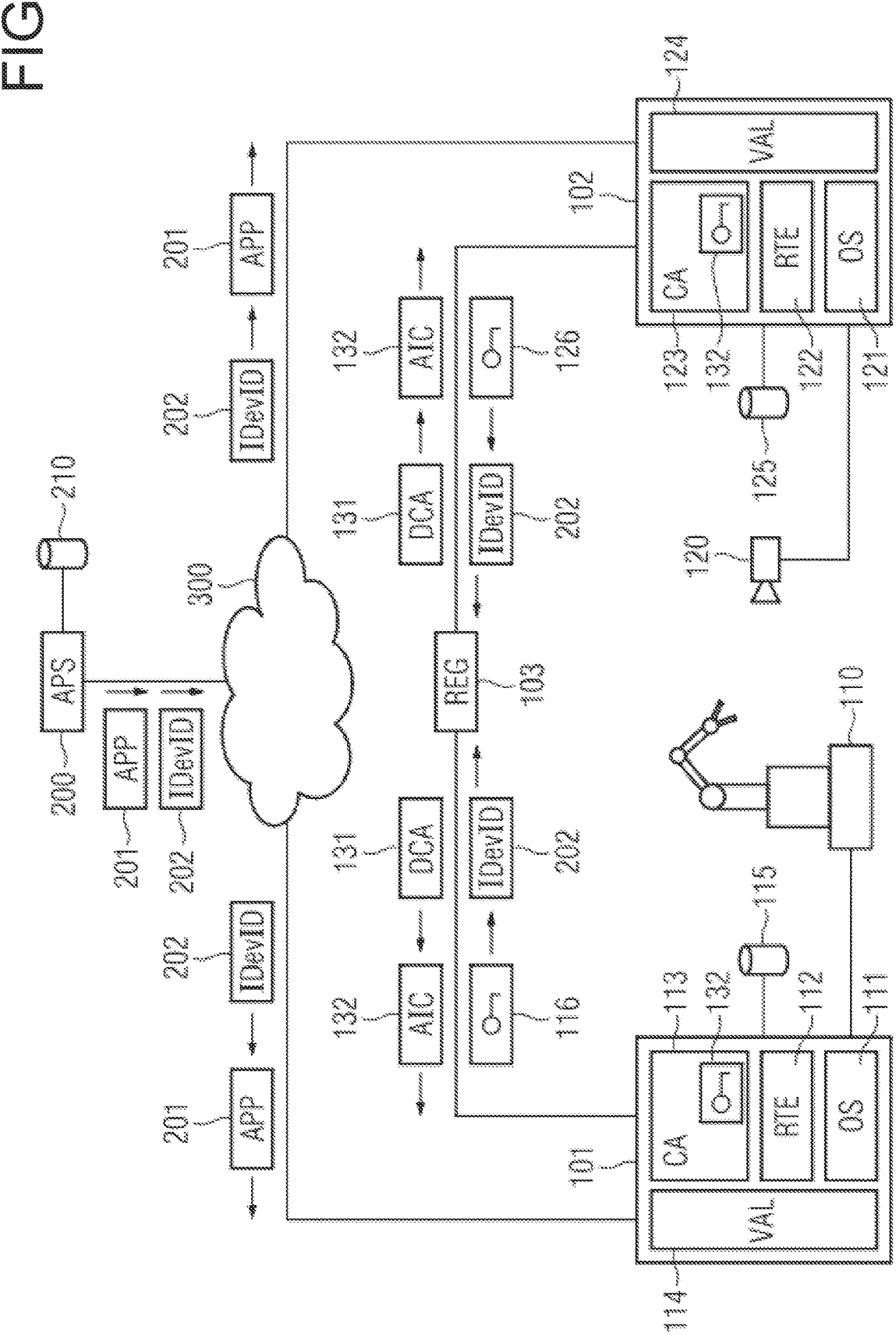
FIG. 1 shows a system comprising a plurality of hosts for providing control applications, an app store and a registration component in accordance with the invention.

The system illustrated in the FIG. 1 comprises a plurality of hosts 101, 102, an app store 200 and a registration component 103. In the present exemplary embodiment, the hosts 101, 102 and the registration component 103 are formed by a subnetwork that is safeguarded via a firewall system and that is assigned to an industrial automation system. The safeguarded subnetwork is connected to the app store 200 via a wide area network 300, which provides internet communication connections, in particular.

In the present exemplary embodiment, the hosts 101, 102 implement functions of automation devices, for example, operator control and observation stations, programmable logic controllers, RFID readers or systems for automatic image processing. Besides the hosts 101, 102 and the registration component 103, the safeguarded subnetwork of the industrial automation system can also comprise network infrastructure devices, such as switches or routers. Network infrastructure devices particularly serve for connecting programmable logic controllers, input/output units (I/O modules) or operator control and observation stations.

Programmable logic controllers each comprise a communication module, a central unit and at least one input/output unit, for example. Input/output units serve to exchange control and measurement variables between programmable logic controllers and machines or apparatuses controlled by the programmable logic controllers. The central units are provided in particular for determining suitable control variables from detected measurement variables. In principle, input/output units can also be configured as decentralized peripheral modules arranged remotely from a programmable logic controller.

The hosts 101, 102 are configured to provide control applications 113, 123 via software containers that are loadable into a container runtime environment 112, 122 installed on a host operating system 111, 121 and are executable there. The control applications 113, 123 particularly implement functions of automation devices, for example, control and monitoring functions with regard to machines or apparatuses 110, 120 connected to the hosts 101, 102, or other time-critical services.

The app store 200 comprises an image repository 210 for providing stored images 201 for the software containers. In this way, the stored images 201 for the software containers can be retrieved by a multiplicity of users. As an alternative thereto, the stored images 201 can also be provided directly by a provider of the respective control application. In principle, the app store 200 can be formed as a storage and provision system that allows reading and/or writing access for a multiplicity of users.

The software containers for the control applications 113, 123 can each be migrated from one host 101, 102 with container runtime environment 112, 122 to another host 102, 101 with container runtime environment 122, 112 for execution there, or can be executed simultaneously on a plurality of hosts 101, 102 with container runtime environment 112, 122. Preferably, software containers are each configured to run in isolation from other software containers or container groups, e.g., pods, within the container runtime environment on the respective host operating system 111, 121. Advantageously, the software containers can each use a kernel of the host operating system 111, 121 jointly with other software containers running on the respective host 101, 102. In principle, other micro-virtualization concepts, such as snaps, can also be used for the software containers as an alternative to docker containers.

In the present exemplary embodiment, the container runtime environment 112, 122 is a container engine used to establish, erase and/or link virtual resources. Here, besides software containers, the virtual resources also comprise virtual communication networks and connections assigned thereto. In particular, the container runtime environment 112, 122 can comprise a docker engine or a snap core that runs on the respective automation device 101, 102.

For the secure execution of control applications, a check component 114, 124 (formed as a ticket generator) of the respective host 101, 102 calculates a respective ticket or check identifier 116, 126 via host-specific features and via features of the respective control application 113, 123. The check identifier 116, 126 is preferably signed via a signature key assigned to an initial device certificate of the respective host 101, 102.

By virtue of the fact that the check component 114, 124 is assigned to the respective host 101, 102 and not to the app store 200, secure use of sideloaded apps is simplified, in particular. In addition, the app store 200 is relieved of the burden of creating the check identifiers 116, 126. The check components 114, 124 are each called up after installation of a control application 113, 123 and gather information required for creating the check identifiers 116, 126. With respect to their construction, the check identifiers 116, 126 are preferably based on OPC Foundation Specification Part 21, but may also deviate herefrom.

With the check identifier 116, 126, the respective host 101, 102, via a secure connection, for example, in accordance with OPC Foundation Specification Part 21, can log on to a registration component 103 and start application software provisioning. For this purpose, the check identifier 116, 126 and an initial application certificate 202 of the respective control application 113, 123 are communicated to the registration component 103. In particular, the respective host 101, 102 is authenticated vis-à-vis the registration component 103 via the check identifier 116, 126.

In the present exemplary embodiment, the initial application certificate 202 is an Initial Device Identifier (IDevID) generated in accordance with IEEE standard 802.1AR and provided by the app store 200. As an alternative thereto, the initial application certificate 202 can also be provided by a provider of the respective control application 113, 123. The check identifier 116, 126 and the initial application certificate 202 each comprise a common identifier, via which the check identifier and the initial application certificate are linked with one another. Such a common identifier can be a ProductInstanceURI, for example.

The registration component 103 verifies the check identifier 116, 126 and the initial application certificate 202. Here, the registration component 103 compares indications that the initial application certificate 202 comprises for correspondence with features used to calculate the check identifier 116, 126. If there is correspondence between the indications that the initial application certificate 202 comprises and the compared features, then the registration component 103 validates the check identifier 116, 126 and the initial application certificate 202. In the case of a positive verification result, the registration component 103 creates a device configuration certificate 131 and an application instance certificate 132 and communicates them to the respective host 101, 102.

A linking (or linkage) of the application instance certificate 132 with the respective control application 113, 123 is authorized via the device configuration certificate 131. The linkage of the application instance certificate 132 with the respective control application 113, 123 results in authentication functions of the control application 113, 123 being supplied and/or configured with the application instance certificate 132. An execution of the container providing the respective control application 113, 123 on the respective host 101, 102 is therefore authorized by the application instance certificate 132.

The application instance certificate 132 and the device configuration certificate 131 are in a trust relationship with one another. On account of this trust relationship, the respective control application 113, 123 trusts the registration component 103 or the device configuration certificate 131 and permits a transmission or a use of the application instance certificate 132. An authorization via the device configuration certificate 131 obviates in particular manual setting up of an authorization granted by the registration component 103. The above trust relationship is based on the provision process described, in which the initial application certificate 202 and the check identifier 116, 126 are used for mutual identity checking.

The check identifier 116, 126, the device configuration certificate 131 and/or the application instance certificate 132 are/is preferably stored in a certificate memory 115, 125 of the respective host 101, 102. In particular, the initial application certificate 202 and/or the application instance certificate 132 can comprise license information defining a functional scope of the respective control application 113, 123.

FIG. 2 is a flowchart of the method for the secure execution of control applications 113, 123 provided via software-implemented containers which are each loadable into a container runtime environment 111, 112 set up on a host 101, 102 and are executable in the container runtime environment 112, 122.

The method comprises calculating, by a check component 114, 124 of a respective host, a respective check identifier 116, 126 via host-specific features and via features of a respective control application, as indicated in step 210.

Next, the respective check identifier and an initial application certificate 202 of the control application are communicated to a registration component 103, as indicated in step 220.

Next, the registration component 103 verifies the respective check identifier and the initial application certificate and, in cases of a positive verification result, creates a device configuration certificate 131 and an application instance certificate 132 and communicates the created device configuration certificate 131 and the created application instance certificate 132 to the host, as indicated in step 230.

Next, linkage of the created application instance certificate with the respective control application is authorized via the created device configuration certificate, as indicated in step 240.

Next, execution of the container providing the respective control application on the host by the created application instance certificate is authorized, as indicated in step 250.

Thus, while there have been shown, described and pointed out fundamental novel features of the invention as applied to a preferred embodiment thereof, it will be understood that various omissions and substitutions and changes in the form and details of the methods described and the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A method for securely executing control applications provided via software-implemented containers which are each loadable into a container runtime environment set up on a host and are executable in the host, the method comprising:
   calculating, by a check component of a respective host, a respective check identifier via host-specific features and via features of a respective control application;
   communicating the respective check identifier and an initial application certificate of the control application to a registration component;
   verifying, by the registration component, the respective check identifier and the initial application certificate and, in cases of a positive verification result, creating a device configuration certificate and an application instance certificate and communicating said created device configuration certificate and said created application instance certificate to the host;
   authorizing linkage of the created application instance certificate with the respective control application via the created device configuration certificate; and
   authorizing execution of the container providing the respective control application on the host by the created application instance certificate.

2. The method as claimed in claim 1, wherein the check identifier is signed via a signature key assigned to an initial device certificate of the host.

3. The method as claimed in claim 2, wherein the initial application certificate is provided in each case by one of (i) a provider of the respective control application and (ii) an app store.

4. The method as claimed in claim 2, wherein the check identifier and the initial application certificate each comprise a common identifier, via which the check identifier and the initial application certificate are linked with one another.

5. The method as claimed in claim 1, wherein the initial application certificate is provided in each case by one of (i) a provider of the respective control application and (ii) an app store.

6. The method as claimed in claim 5, wherein the check identifier and the initial application certificate each comprise a common identifier, via which the check identifier and the initial application certificate are linked with one another.

7. The method as claimed in claim 1, wherein the check identifier and the initial application certificate each comprise a common identifier, via which the check identifier and the initial application certificate are linked with one another.

8. The method as claimed in claim 1, wherein the linkage of the application instance certificate with the control application results in authentication functions of the control application being at least one of supplied and configured with the created application instance certificate.

9. The method as claimed in claim 1, wherein the host is authenticated vis-à-vis the registration component via the check identifier; and wherein the registration component compares indications which the initial application certificate comprises for correspondence with features utilized to calculate the check identifier.

10. The method as claimed in claim 9, wherein the registration component validates the check identifier and the initial application certificate in cases of correspondence between the indications which the initial application certificate comprises and the compared features.

11. The method as claimed in claim 1, wherein at least one of (i) the check identifier, (ii) the device configuration certificate and (iii) the application instance certificate is stored in a certificate memory of the host.

12. The method as claimed in claim 1, wherein the initial application certificate is an Initial Device Identifier, IDevID generated in accordance with Institute of Electrical and Electronics Engineers (IEEE) standard 802.1AR.

13. The method as claimed in claim 1, wherein at least one of (ii) the initial application certificate and (ii) the application instance certificate comprises license information defining a functional scope of the control application.

14. A system comprising:

at least one host including a processor and memory; and a registration component;

wherein the processor of the at least one host is configured to:

provide control applications via software-implemented containers which are each loadable into a container runtime environment set up on the host and are executable in the at least one host;

wherein the at least one host further comprises a check component configured to calculate a respective check identifier via host-specific features and via features of a respective control application;

wherein the at least one host is further configured to communicate the check identifier and an initial application certificate of the respective control application to the registration component;

wherein the registration component is configured to verify the check identifier and the initial application certificate and, in cases of a positive verification result, to create a device configuration certificate and an application instance certificate and to communicate said created device configuration certificate and said created application instance certificate to the host; and wherein the host is further configured to authorize linkage of the created application instance certificate with the respective control application via the device configuration certificate and to authorize an execution of the container providing the respective control application by the application instance certificate.

15. A host for a system, the host being configured to provide control applications via software-implemented containers which are each loadable into a container runtime environment set up on the host and are executable in the host, the host comprising:

a processor;

memory; and a check component configured to calculate a respective check identifier via host-specific features and via features of a respective control application;

wherein the host is configured to communicate the respective check identifier and an initial application certificate of the control application to a registration component; and wherein the host is further configured to authorize a linkage of an application instance certificate generated by the registration component with the respective control application via a device configuration certificate generated by the registration component and to authorize an execution of the container providing the respective control application by the application instance certificate.

* * * * *